United States Patent [19]

Linneborn et al.

[11] Patent Number: 4,459,136
[45] Date of Patent: Jul. 10, 1984

[54] APPARATUS FOR DRYING, PYROLYZING, AND GASIFYING LUMP WOOD

[75] Inventors: Hans Linneborn, Wiesbaden; Josef Weisz, Eltville, both of Fed. Rep. of Germany

[73] Assignee: Fritz Werner Industrie-Ausrustungen GmbH, Geisenheim, Fed. Rep. of Germany

[21] Appl. No.: 404,982

[22] Filed: Aug. 4, 1982

[30] Foreign Application Priority Data

Aug. 8, 1981 [DE] Fed. Rep. of Germany ....... 3131476

[51] Int. Cl.³ ............................. C10J 3/02; C10J 3/20; C10J 3/80
[52] U.S. Cl. ......................................... 48/111; 48/76; 48/203; 48/209; 201/25; 202/99
[58] Field of Search ................... 48/111, 124, 76, 203, 48/209; 201/25, 34; 202/99, 93; 422/173, 203

[56] References Cited

U.S. PATENT DOCUMENTS 1,418,745  6/1922  Sworski et al. ..................... 48/124
3,098,799  7/1963  Crawford ........................... 202/93
4,074,979  2/1978  Kurisu et al. ....................... 48/111

FOREIGN PATENT DOCUMENTS 2607593  1/1977  Fed. Rep. of Germany ...... 422/173

Primary Examiner—S. Leon Bashore, Jr.
Assistant Examiner—J. Woodard
Attorney, Agent, or Firm—Allison C. Collard; Thomas M. Galgano

[57] ABSTRACT

An apparatus for drying, pyrolyzing and possibly also gasifying of lump wood in a cylindrical vessel with a hearth case includes a vessel of a type which differs from prior art vessel units by a top cooling hood with an annular cooling duct and an outer annular air space for preheating suction air and an inner, likewise annular, gas space to discharge to some external destination the gas recovered from the predried wood. The air drawn from the outer annular space is fed to the hearth via an air chamber and nozzles. Condensate precipitated on the inside faces of the hood drops into an annular gutter and is subjected to evaporation in the further course of the process. A method for operating this apparatus is also provided.

5 Claims, 4 Drawing Figures

APPARATUS FOR DRYING, PYROLYZING, AND GASIFYING LUMP WOOD

The present invention relates to an apparatus for drying, pyrolyzing and possibly also gasifying lump wood in a cylindrical vessel comprising a hearth case which is disposed in a coaxially spaced relation from the vessel wall, the vessel being provided with a hood on top and a grate at the bottom. The invention also relates to a method for operating the apparatus.

Vessels of this type which are generally called "wood gasifiers", used to be largely employed on commercial vehicles prior to and during World War II. This was especially due to the fact that liquid fuels for operation of motor vehicles had become scarce as a consequence of the war.

A similar development obviously seems to be occurring today due to the fact that liquid fuels are constantly increasing in cost and because the further consequences of these price increases are unpredictable. This is why a renaissance of these wood gasifiers, also called "generators", can be expected.

Even though hundreds of thousands of these units had been in use at the time, they were yet affected by essential drawbacks in the past. These disadvantages have primarily included flow-inhibiting air and gas streams, as well as occasionally occurring high-volume steam vapor development which has caused condensation inside the vessel due to intricate temperature conditions, both of which could not be eliminated and overcome until the present invention. In connection therewith, it can be said that the condensate is a burden on the environment when drained off, and modern engine technology also calls for continuous trouble-free operation which the old type wood gasifiers could not ensure.

Another drawback was that the outside faces of the vessel, and in particular, those of the shell, used to carry considerable temperatures so that applied coatings of paint could not be reasonably durable. The outer appearance of these wood gasifiers was not aesthetic, but of a rusty character; corrosion attack was typical. Adding to this was a steady hazard to human operators because the temperatures of the outer shell were very high so that their hands got burned if they touched the shell or jacket.

It is therefore an object of the present invention to provide an apparatus for drying, pyrolyzing and possibly also gasifying of lump wood inside a cylindrical vessel with a hearth case of the foregoing type which is featured by a previously unobtainable high efficiency and by a completely trouble-free operation.

Moreover, it is a further object of the present invention to provide such an apparatus having an outer shell or jacket, which will permit the application of durable, anticorrosion coats of paint and will no longer constitute a source of hazard and/or burning risk in the case of manual contact therewith.

Certain of the foregoing and related objects are readily attained according to the invention by the provision of an apparatus for drying, pyrolyzing and possibly also gasifying of lump wood in a cylindrical vessel comprising a hearth case which is disposed in a coaxially spaced relation from the vessel inner wall, and including a hood on top and a grate at bottom. The invention is characterized in that an annular duct extends over the outer face of the hood, the duct being provided with a screened lateral air suction opening on one side and an outlet opening on the other for suction air to be carried through a connecting pipe into the outer ring space of the vessel and from there into an air chamber.

In a preferred embodiment of the invention, a condensate water ring is disposed at the lower extremity of the hood, on the inside thereof, and a clamp ring connects the entire hood to the vessel in a manner ensuring absolute pressure air tightness. According to a particularly preferred embodiment of the invention, the air chamber is so designed that a flap type aperture is provided therein in a tangential relationship to the annular plenum chamber. A hearth annular duct extends from the air chamber to a plurality of nozzles which are annularly disposed around the hearth and open into the hearth space proper.

Other objects and features of the present invention will become apparent from the following detailed description considered in connection with the accompanying drawings, which disclose one embodiment of the invention. It is to be understood that the drawings are to be used for the purposes of illustration only, and not as a definition of the limits of the invention.

In the drawings, wherein similar reference characters denote similar elements throughout the several views.

Figure 1:
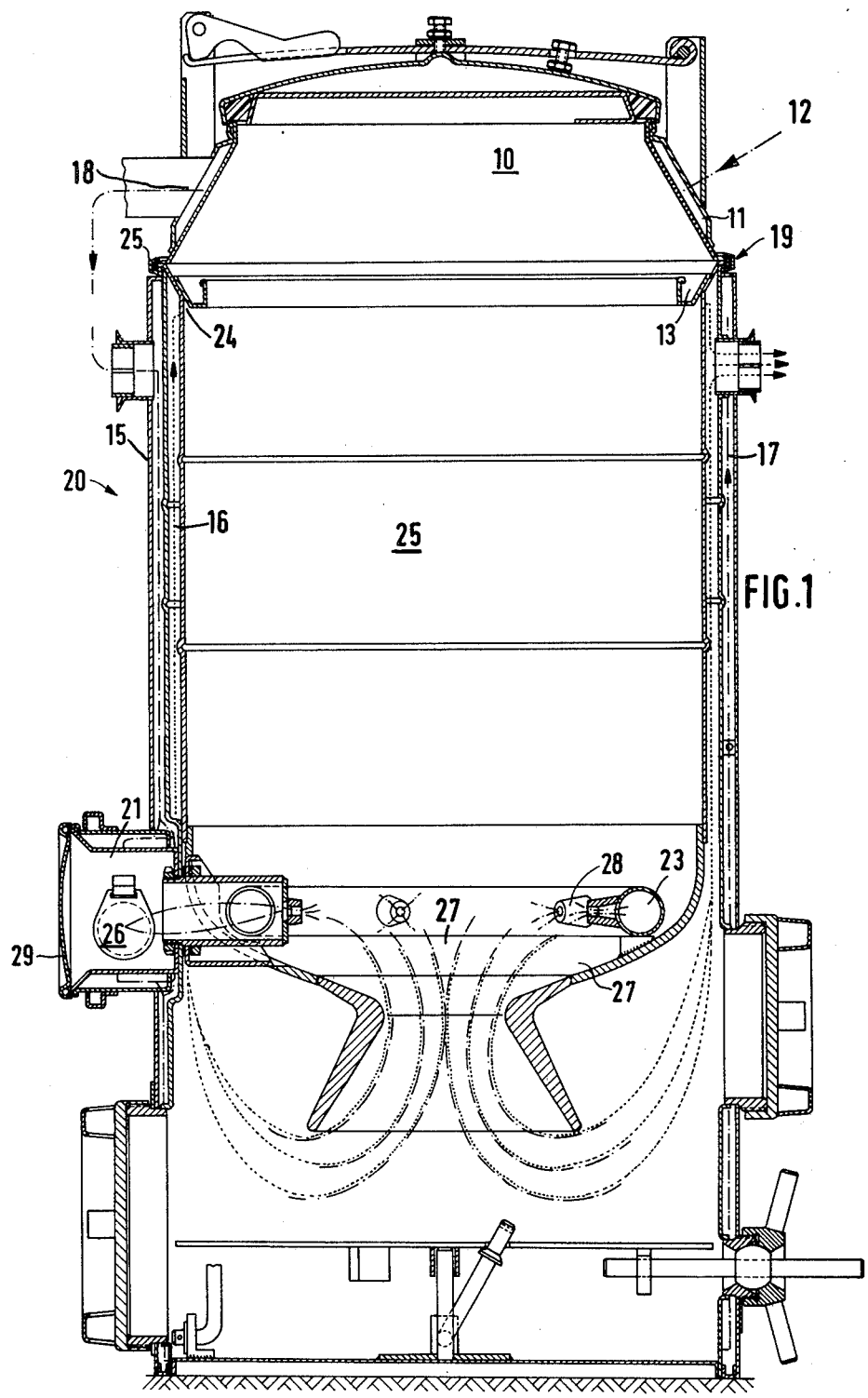
FIG. 1 is a longitudinal sectional view through the apparatus of the present invention, including hood, shell, hearth and grate, as well as air inlet and gas outlet openings.

Referring now in detail to the drawings, the apparatus comprises a hood 10 with an outer annular duct 11 having an air suction opening 12 and, disposed in a 180o staggered relationship thereto, an outlet opening 18. The annular vessel 20 as such carries in its bottom third a hearth case 27 which is secured to the inner shell of vessel 20 in a coaxially spaced manner relative to the outer shell thereof. A drying and gasifying or inner ring chamber 25 serves for discharge of generated gas from the vessel.

It has been known in the art to use and operate wood gasifiers of that type with hearth case and grate, as well as an annular duct. The drying and gasifying processes took place from top to bottom in that the wood charged with its natural content of moisture, but often with a moisture content higher than that also, was subjected to drying in the upper zone and then passed to the central region of the hearth case in which the outgassing zone was located. The gasification process thereafter continued right down to the grate zone. The gas was drawn from the annular zone in the vessel upper part.

Figure 2:
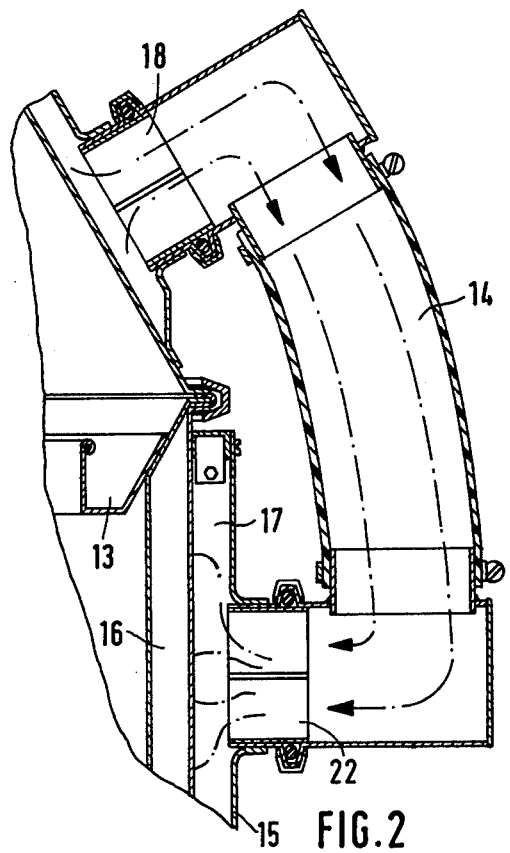
FIG. 2 is an enlarged sectional view showing the air connection between the hood and the outer annular duct.
Figure 3:
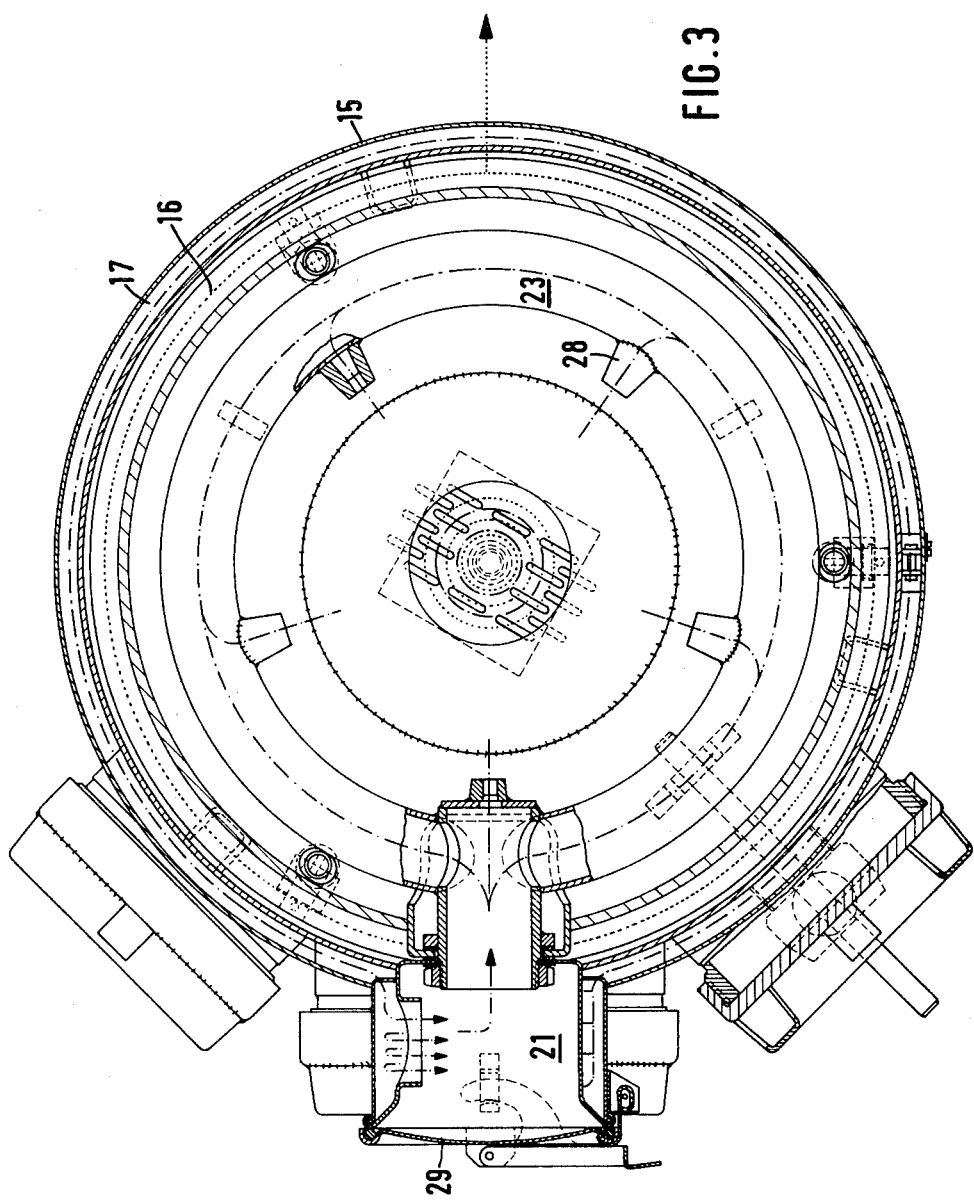
FIG. 3 is a cross-sectional view through the apparatus according to FIG. 1 above the ring nozzle plane.
Figure 4:
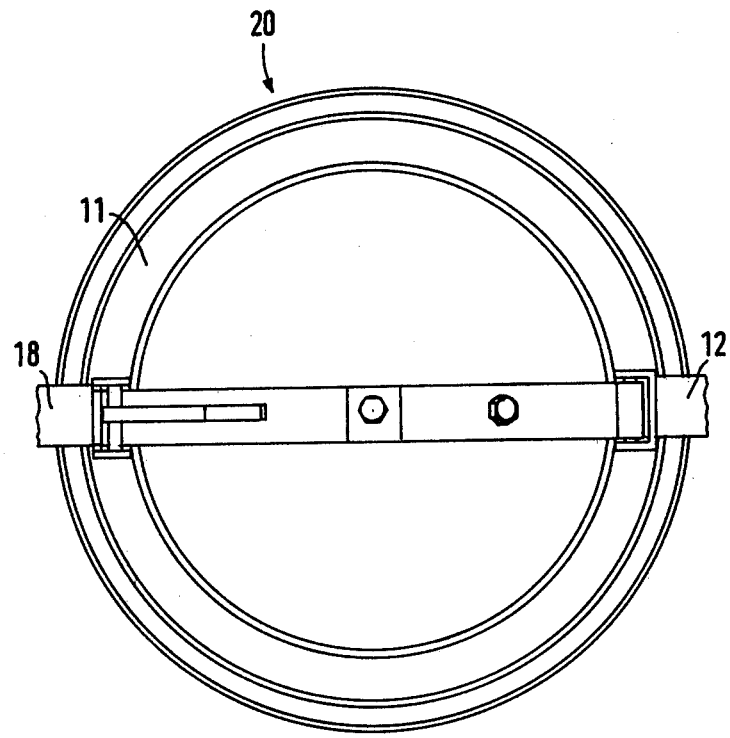
FIG. 4 is a schematic plan view of the hood with an annular duct.

According to the present invention, it is particularly the hood 10 which exhibits completely different and improved functions over the conventional design. As can be seen from FIGS. 1-4, the function of the novel hood 10 is that of condensate formation and collection. Attempts were made by prior designs to solve the aggravating condensate problem by subdividing the upper part of the vessel and providing means to discharge to the outside the condensate forming there, but this has a very disturbing influence on the process. These attempts, too, only yielded poor results and, besides causing other problems, led to considerable burdens on the environment, especially where it was allowed to get into effluent water disposal systems.

On the other hand, the present invention provides for condensate formation to take place at the hood inner surface due to cooling in the cooling ring 11 inside hood 10 from where the liquid condensate flows into a condensate water ring or gutter 13 disposed all around the inner top marginal edge 24 of vessel 20. Thermal processes inside the apparatus produce temperatures of such magnitude that the liquid condensate evaporates in gutter 13 as the last process step in the further course of its discharge flow.

The air flow is routed such that air gets into the cooling ring or annular duct 11 via the air suction opening 12 provided in hood 10 and is forced to flow around hood 10 and thus cool it. Condensate precipitates on the inner wall of the hood in the first process step. Air enters through connecting pipe 14 between annular duct 11 on the hood 10 and the air inlet to the outer annular space or duct 17 and from there into air chamber 21. This air is already preheated. It is from air chamber 21 that air in this preheated state is distributed to air nozzles 28 via the hearth annular duct 23, said nozzles serving to feed the necessary amount of air which also contains oxygen to the material to be gasified in the upper part of the hearth 27, i.e., to the dried lump wood.

An initial cooling effect is produced in the initial phase of the process due to suction air in hood 10. As temperature rises in the outer annular space 17, the inlet air gets preheated to increasingly higher temperatures according to the present invention. This establishes such thermal conditions inside vessel 20 which permit processing and gasifying of lump wood of essentially higher moisture content in the drying and gasifying and/or inner ring chamber 25. This is a very important advantage of the present invention over conventional wood gasifiers.

The air chamber 21 has an outer closure 29 and a lateral non-return damper 26 tangentially opening thereinto. Air chamber 21 is needed to initiate operation of the apparatus by charging highly combustible material such as excelsior into it.

The purpose of said tangential arrangement of non-return damper 26 is to avoid the previous drawback of lightoff material getting caught by or stuck to the ignition flap, and hence, leakage of the entire non-return damper assembly.

Operation of the apparatus is such that the condensate forming especially in the low-temperature initial phase is precipitated on the inner cooling faces of the hood 10. It then drops into the collecting gutter or condensate ring 13 and, finally, undergoes evaporation as the operating temperature increases.

The apparatus according to the present invention is of a design as compared to the established state of the art which permits an ancient system no longer suitable for industrial use, to be reused in a modern version, meeting industrial needs and requirements, to thereby carry into effect an economical and liquid fuel saving piece of equipment and method. The considerable weight saving also obtained is a factor of particular importance under the aspect that the apparatus according to the present invention is intended not only for stationary, but chiefly for mobile applications. The annular spaces 16, 17 ensure exceptional static stability so that lighter-gauge plates can be used in which corrugations or fins may even be formed for reinforcement or stiffening.

The clamp ring connecting the apparatus subassemblies of the present invention as aforesaid eliminates the need for use of conventional type flange connection with their many boltings.

While only one embodiment of the present invention has been shown and described, it is obvious that many changes and modifications may be made thereunto without departing from the spirit and scope of the invention.

What is claimed is:

1. In an apparatus for drying, pyrolyzing and gasifying of lump wood of the type having a substantially closed, cylindrical vessel having a vessel wall and a hearth case which is disposed in a coaxially spaced manner from the vessel wall, a hood on top, and a grate at the bottom, the improvement comprising:

said hood having a suction opening and an outlet opening and being surrounded by an annular hood duct; and said vessel having a hearth ring chamber, an air chamber communicating with said hearth ring chamber, an outer annular duct which surrounds said vessel and opens onto said air chamber and a connecting pipe which establishes communication between said annular hood duct and said annular vessel duct in a manner ensuring absolute pressure air tightness.

2. The apparatus of claim 1, wherein a condensate water gutter is mounted at the bottom extremity of said hood.

3. The apparatus of claim 1 or 2, wherein said vessel has a top marginal edge and wherein said hood and said top marginal edge are sealingly connected to each other by means of a clamp ring.

4. The apparatus of claim 1, wherein said air chamber has a damper opening extending tangentially into said hearth ring chamber.

5. In a method for operating an apparatus for drying, pyrolyzing and gasifying lump wood of the type having a substantially closed, cylindrical vessel having a vessel wall and a hearth case which is disposed in a coaxially spaced manner from the vessel wall, a hood on top, and a grate at the bottom, wherein after initiation of the gasifying process and temperature build-up to operating temperature whereby steam vapor is formed which streams upwardly, the improvement comprising the steps of:

cooling the inner faces of said hood to effect precipitation of said steam vapor and to thereby form a condensate;

collecting said condensate in a collecting gutter; and evaporating said condensate by means of the operating temperature acting thereon.

* * * * *